(12) United States Patent
Sheymov et al.

(10) Patent No.: US 7,698,444 B2
(45) Date of Patent: Apr. 13, 2010

(54) SYSTEMS AND METHODS FOR DISTRIBUTED NETWORK PROTECTION

(75) Inventors: Victor I. Sheymov, Vienna, VA (US); Roger B. Turner, Laurel, MD (US)

(73) Assignee: Invicta Networks, Inc, Reston, VA (US)

( * ) Notice: Subject to any disclaimer, the term of this patent is extended or adjusted under 35 U.S.C. 154(b) by 0 days.

(21) Appl. No.: 11/723,793

(22) Filed: Mar. 22, 2007

(65) Prior Publication Data

US 2007/0168532 A1 Jul. 19, 2007

Related U.S. Application Data

(60) Continuation of application No. 11/490,046, filed on Jul. 21, 2006, now Pat. No. 7,197,563, which is a division of application No. 09/867,442, filed on May 31, 2001, now Pat. No. 7,089,303.

(60) Provisional application No. 60/208,056, filed on May 31, 2000.

(51) Int. Cl.
*G06F 15/16* (2006.01)
*G06F 15/173* (2006.01)

(52) U.S. Cl. ...................... 709/229; 709/224

(58) Field of Classification Search .......... 709/224, 709/227, 229; 726/16, 23, 27, 22
See application file for complete search history.

(56) References Cited

U.S. PATENT DOCUMENTS 5,239,294 A * 8/1993 Flanders et al. ............ 340/5.74
5,550,551 A 8/1996 Alesio
5,694,335 A * 12/1997 Hollenberg .................. 726/16
5,796,952 A 8/1998 Davis et al.

(Continued)

FOREIGN PATENT DOCUMENTS

WO WO 00/42742 A1 7/2000

(Continued)

OTHER PUBLICATIONS

Related U.S. Appl. No. 09/925,503, filed Aug. 10, 2001, "Systems and Methods for Distributed Network Protection".

(Continued)

*Primary Examiner*—Jeffrey Pwu
*Assistant Examiner*—Gerald Smarth
(74) *Attorney, Agent, or Firm*—Carlos R. Villamar; Roberts Mlotkowski Safran & Cole, P.C.

(57) ABSTRACT

By distributing various information and monitoring centers that monitor distributed networks and unauthorized access attempts, it is possible to, for example, more quickly defend against an unauthorized access attempts. For example, a Level 1 monitoring center could monitor a predetermined geographical area serving, for example, a wide variety of commercial and public sites, an organizational structure, or the like, for alarms. Upon analyzing an alarm for various characteristics, the Level 1 monitoring center can refer the unauthorized access attempt to an appropriate Level 2 center for, for example, possible retaliatory and/or legal action. Then, a Level 3 monitoring center can record and maintain an overall picture of the security of one or more networks, the plurality of monitoring centers and information about one or more hacking attempts.

27 Claims, 4 Drawing Sheets

U.S. PATENT DOCUMENTS

| | | | |
|---|---|---|---|
| 5,825,283 A | | 10/1998 | Camhi |
| 5,864,683 A | * | 1/1999 | Boebert et al. ............... 709/249 |
| 5,867,495 A | * | 2/1999 | Elliott et al. ................ 370/352 |
| 5,969,433 A | | 10/1999 | Maggiora et al. |
| 6,049,272 A | * | 4/2000 | Lee et al. ................ 340/539.18 |
| 6,154,844 A | * | 11/2000 | Touboul et al. ................ 726/24 |
| 6,256,773 B1 | * | 7/2001 | Bowman-Amuah ......... 717/121 |
| 6,275,942 B1 | | 8/2001 | Bernhard et al. |
| 6,363,489 B1 | | 3/2002 | Comay et al. |
| 6,370,573 B1 | * | 4/2002 | Bowman-Amuah ......... 709/223 |
| 6,405,318 B1 | * | 6/2002 | Rowland ..................... 726/22 |
| 6,519,703 B1 | | 2/2003 | Joyce |
| 6,735,702 B1 | * | 5/2004 | Yavatkar et al. ............... 726/13 |
| 6,738,909 B1 | | 5/2004 | Cheng et al. |
| 6,748,540 B1 | | 6/2004 | Canestaro et al. |
| 6,886,102 B1 | | 4/2005 | Lyle |
| 6,975,220 B1 | * | 12/2005 | Foodman et al. ............ 340/531 |
| 6,981,146 B1 | * | 12/2005 | Sheymov .................... 713/172 |
| 7,089,303 B2 | | 8/2006 | Sheymov et al. |
| 2002/0003571 A1 | * | 1/2002 | Schofield et al. ............ 348/148 |
| 2002/0023227 A1 | | 2/2002 | Sheymov et al. |

FOREIGN PATENT DOCUMENTS

| | | |
|---|---|---|
| WO | WO 01/84270 | 11/2001 |
| WO | WO 01/95590 | 12/2001 |

OTHER PUBLICATIONS

Dahlia Malkhi, et al.; "Secure Execution of Java Applets Using a Remote Playground"; AT&T Labs Research, Florham Park, NJ; 1988 IEEE; pp. 40-51.

John Pescatore; "Secure Use of the World Wide Web: Keeping Browsers and Servers From Getting Snared"; Trusted Information System; ISBN# 0-7803-3277-6; pp. 36-38.

RSA Security; "Are Passwords Really Free? A Closer Look at the Hidden Costs of Password Security"; pp. 1-8.

White G .B. et al. "Cooperating Security Managers: A Peer-Based Intrusion Detection System" IEEE Network, IEEE Inc. New York, US, vol. 10, No. 1, 1996, pp. 20-23, XP000580083, pp. 20-23.

Talpade R., Kim G., Khurana S.: "NOMAD: Traffic-based Network Monitoring Framework for Anomaly Detection" Proceedings IEEE International Symposium on Computers and Communications, Jul. 6-8, 1999, pp. 442-451.

International Search Report dated Feb. 13, 2002, 4 pages.

* cited by examiner

SYSTEMS AND METHODS FOR DISTRIBUTED NETWORK PROTECTION

CROSS REFERENCE TO RELATED DOCUMENTS

The present invention is a continuation of U.S. patent application Ser. No. 11/490,046, filed Jul. 21, 2006, now allowed, which is a divisional of U.S. patent application Ser. No. 09/867,442, filed May 31, 2001, now U.S. Pat. No. 7,089,303, which claims benefit of priority to U.S. Provisional Patent Application Ser. No. 60/208,056, filed May 31, 2000, the entire disclosures of all of which are hereby incorporated by reference herein.

BACKGROUND OF THE INVENTION

1. Field of the Invention

In general, the systems and methods of this invention relate to protecting distributed networks. In particular, the systems and methods of this invention relate to protecting distributed networks through a hierarchical analysis and action determination topology.

2. Description of Related Art

The nation's information infrastructure, based in large part on the Internet, has become an integral part of normal business and is becoming critical to the national security of many countries. The intrusion into public and private networks by unauthorized individuals is a major problem for many nations. Foreign powers, and a variety of hackers, i.e., individuals or entities who attempt to obtain unauthorized access to one or more networks or information, continue to develop systems and methods that interrupt communications, damage files, damage computer and network systems, and gain access to private information. Many tools, such as firewalls, passwords and network security schemes have been developed in an attempt to provide protection to various aspects of distributed networks.

SUMMARY OF THE INVENTION

However, in light of the magnitude of the problem, a coordinated effort could greatly assist in countering the potentially devastating effects of unauthorized access into private or restricted areas of cyberspace. Furthermore, by coordinating efforts, an exemplary embodiment of the systems and methods of this invention allow the collection of information on incidents of hacker attacks, analysis and summarization of such information, identification of the source of these attacks, and appropriate law enforcement or retaliatory acts in response to these unauthorized attacks.

There are two basic approaches to the development of a distributed network protection system. In a first exemplary approach, one or more monitoring centers act independently of any attacked targets. This exemplary system could place sensors at various locations within a distributed network to examine all traffic, or a sampling thereof, for possible unauthorized access attempts. For example, origination addresses could be compared to destination addresses to determine if the user is an authorized user, information could be scanned for profiles of particular executable code, or the like. A second exemplary approach would be to place unauthorized access attempt detection systems at specific locations within a distributed network. For example, the unauthorized access attempt detection system could be collocated with a firewall of a particular entity on a distributed network, such as the Internet. Alternatively, the unauthorized access attempt detection system could be similar to that used in U.S. Provisional patent application No. 60/226,088, entitled "Cyber Hacking Attack Tracing and Retaliation Methods and Systems," incorporated herein by reference in its entirety. In this exemplary embodiment, the unauthorized access attempt is detected by these localized monitoring centers thereby restricting a need to analyze all traffic on the distributed network. With these localized systems, an unauthorized access attempt can be detected in real-time, and pertinent information regarding the attempt forwarded to a monitoring system for verification and determination of an appropriate response and/or action.

Accordingly, aspects of the present invention relate to a protection system for a portion of a distributed network. In particular, an exemplary embodiment of the invention provides systems and methods for analyzing unauthorized access attempts.

A further aspect of the invention relates to determining an appropriate response and/or action in response to an unauthorized access attempt.

An additional aspect of the invention relates to establishing a hierarchical monitoring scheme that monitors one or more of information traffic and unauthorized access attempt alarms within a distributed network.

An additional aspect of the invention relates to distributing monitoring centers such that the burden of analyzing distributed network traffic and unauthorized access attempt alarms can be performed in real-time or near real-time.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

Figure 1:
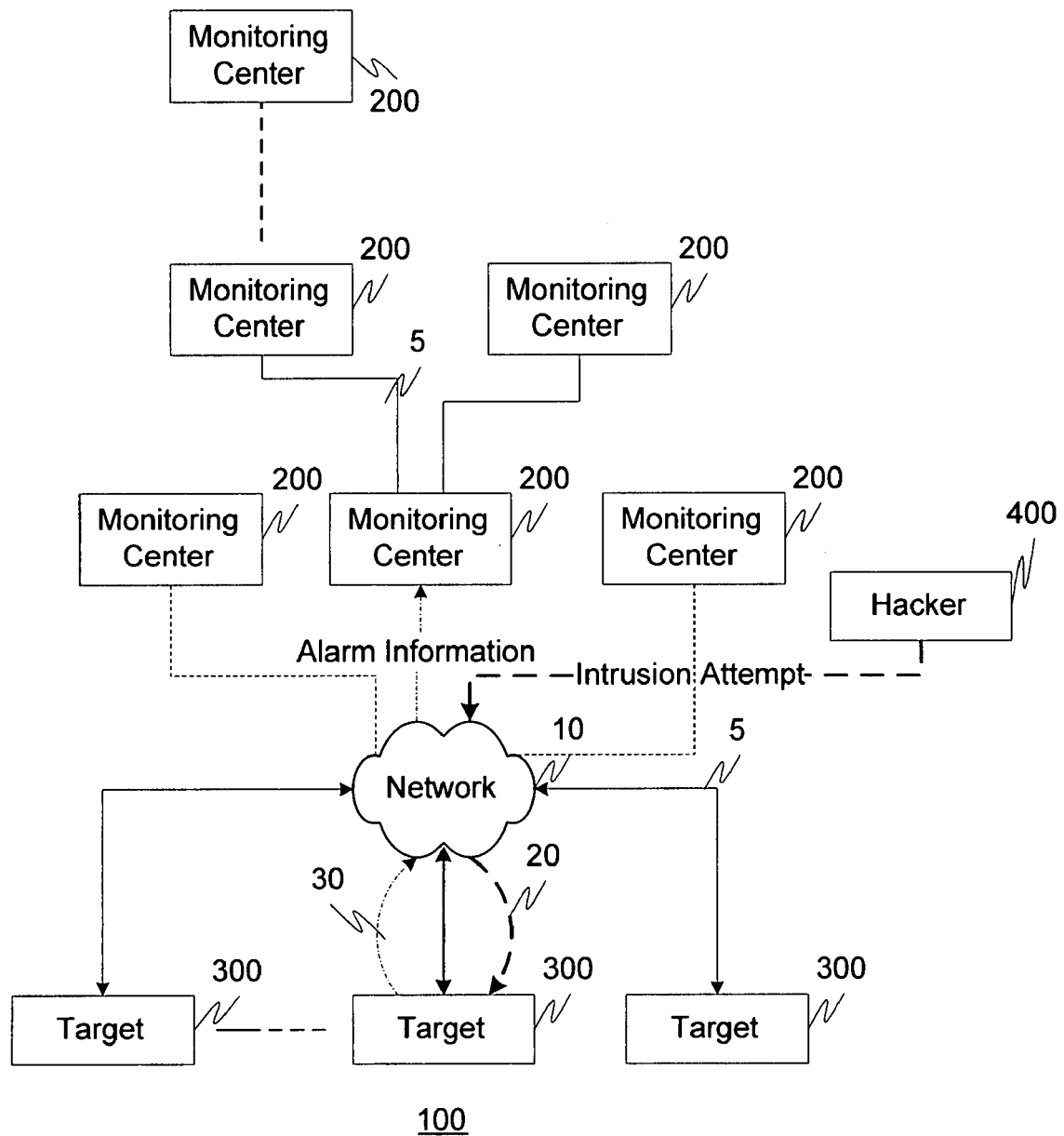
FIG. 1 illustrates an exemplary embodiment of the distributed network protection system according to this invention.

In an exemplary embodiment of this invention, the distributed network protection system could be developed as a separate infrastructure containing both centralized and distributed databases of hacker information such as, profiles, signatures, attack attempt profiles, or the like. In general, any information that may be of assistance in determining one or more of the verification of an unauthorized access attempt and/or the identity of the hacker(s) can be stored in the databases. This information can be, for example, generated in response to alarms received from one or more targets or, for example, amassed through an analysis of all or a portion of the traffic within a portion of a distributed network, such as a local area network, the Internet, a private network, a wide area network, or the like. In this exemplary embodiment, the multi-layered distributed network protection system utilizes, for example, real-time unauthorized access attempt alarms from one or more secured sites. The secure sites would report unauthorized access attempts to the distributed network protection system that could, for example, maintain databases of known attackers and their methods, and could be capable of analysis of multiple ongoing attacks on different secured sites, tracking origins of these attacks, documenting the attacks for possible future prosecution, and supporting retaliatory measures if warranted.

By distributing various information pertaining to the distributed network and unauthorized access attempts, it is possible to, for example, more quickly defend against an unauthorized access attempt by instituting a series of distributed monitoring centers dedicated to specific portions of the distributed network. For example, a Level 1 monitoring center could monitor a predetermined geographical area serving, for example, a wide variety of commercial and public sites, or an organizational structure serving, for example, such institutions as law enforcement, Department of Defense, Armed Forces, the government, commercial organizations, e-commerce or the like. An exemplary Level 1 monitoring system could focus monitoring on attacks within defined cyber boundaries. These monitoring centers could receive information on an attack in progress and optionally a referral feature enabling the monitoring center to pose as the attacked site to the attacker for the purposes of, for example, positive identification of the attacker. Upon a triggering event, such as a predetermined number of received alarms, a predetermined number of positive hacked identifications, or any other threshold, the Level 1 monitoring center can refer the unauthorized access attempt to an appropriate Level 2 center for possible retaliatory and/or legal action.

Level 2 centers could receive, for example, referrals from Level 1 monitoring centers and make a decision on possible retaliatory action and/or other action if warranted, for example, by the nature of the attack. These Level 2 centers could also receive and analyze cumulative information on unauthorized access attempts from underlying Level 1 monitoring centers within, for example, predefined geographic, organizational, cyber boundary, or the like.

Level 3 monitoring centers could collect and analyze information from Level 2 monitoring centers to, for example, monitor the overall security condition of a distributed network, such as the national cyberspace of one or more countries.

However, while the above example illustrates a three tiered monitoring center scheme, the number of monitoring center levels and the tasks assigned to those levels can be varied depending on, for example, the specific implementation of the distributed network protection system, or the like.

Unauthorized access attempt attack alerts can be generated in at least two different ways. First, for example, all traffic through a given portion of a distributed network is monitored for unauthorized access attempts. Secondly, portions of a distributed network can be monitored with unauthorized access attempt detection systems that can forward an alarm to, for example, one or more Level 1 type monitoring centers and the unauthorized access attempt "handed-off" to a higher level monitoring center when an escalation parameter(s) is satisfied to, for example, perform further action, or the like. The hand-off could include, for example, information such as the destination address of the attacked target, the source address for the last clearing hop of the hacker, a copy of the pertinent part of the attacking packet, or any other information relevant to the unauthorized access attempt. Furthermore, other unauthorized access attempt protection systems, such as systems embedded in a firewall or operating system based protection present at the target site could gather other information about the unauthorized access in real-time or near realtime and provide this information to one or more of the monitoring centers. Additionally, such localized intrusion attempt detection systems could provide, for example, information regarding a suspected attack, or the like.

An exemplary embodiment of the distributed network protection system could also include one or more distributed and/or centralized databases. For example, a centralized database could be located at a Level 3 monitoring center, whereas both Level 1 and Level 2 monitoring centers could maintain their own distributed databases linked to the central database at the Level 3 monitoring center. These databases can obviously include various protection schemes to shield unauthorized access to users and to conduit host data, detailed hacker data, sanitized attacker data, and law-enforcement data and links, or the like. By distributing the functionality and the resources of the monitoring centers in this way, there is a greater chance of being able to verify that the unauthorized access attempt is real and react to the unauthorized access attempt in real-time thereby, for example, providing greater security to a portion of the protected distributed network.

Current cyber-protection systems employ difficult and labor-intensive investigative techniques. Furthermore, current cyber-protection systems do not operate in real-time, therefore increasing the difficulty of tracing the origin of the attack becomes more difficult given the increasing sophistication of the attackers who employ various techniques to cover their tracks. This is further complicated by the fact that hackers usually do not use direct attempts to penetrate a target. Typically, a hacker will route the attack information through several hosts using each host as a conduit through which one or more attacks are launched.

The origin of an unauthorized access attempt can be most effectively traced in real-time, i.e., during the course of the attack. While attackers often use various methods to disguise the real origin of the attack, there is at least one fundamental requirement for any hacking attack to succeed that can be used for tracking its origin. Indeed, except for a denial of service attack, hacking by its nature requires a target system's response to attacking packets be received by the attacker directly or indirectly. This means that no matter how sophisticated a disguise mechanism is, the attacking system makes itself available to receive such a response. This vulnerability can be utilized effectively for tracking an unauthorized access attempt.

Specifically, unauthorized access attempt tracking can be done autonomously, by, for example, a monitoring center, without necessarily implementing a surveillance scheme. In this exemplary embodiment, when a hacking attack is detected and confirmed as a hostile act, a concealed program can be embedded in the response to the attacker. When the attacking station, e.g., one or more computers operated by a hacker, receives the target station's response, the concealed program could act like a worm within the attacking station(s). This worm can determine if, for example, the attacking station has a hostile intent, and, if the intent is confirmed, secretly forward the identification, such as an IP address, to the target station or monitoring center.

In other words, in the case of an HTML page being sent as a response to a hacking attack, the page can contain a worm, such as an embedded portion of executable code, Java® script, cookie, or the like, which could be invisible to a viewer and, for example, probe the hackers computer for specific information. Alternatively, a disguised request that could confirm hostile intent could be included in a HTML page. For example, if the target system does not employ a particular feature, a fake request for such a feature could be made. By the act of attempting to enter or respond to this feature, the attacker confirms that they are not familiar with the target system and they are trying to enter the system in an unauthorized manner. The concealed program, or worm, could then be triggered if an attacker enters any response. This concealed program could then instruct the attacker's browser, or other comparable device, to secretly send the attacker's true identity to a predetermined destination, such as a specific IP address. This IP address could, for example, be passed along to a predetermined monitoring center along with any other pertinent information gathered about the hacker.

For certain attacks, then autonomous method, such as the one described above, may not produce the desired result. In such instances, a more complex method involving cooperative reporting systems could be utilized. This would require, for example, full cooperation between one or more distributed network protection systems, and, for example, private and government information technology communities. Using this exemplary method, a target, having confirmed a hacking attack, could include a flag concealed into its response. Then, participating nodes and conduit hosts could be supplied and updated with this hacker related validated information so that the participating entities can detect passage of the flag and, for example, record information related to the flag and associated data. In this way, even though an attacker may have removed the information relating to the true origin of the attack by using several intermediary computer systems, the attacker would still need to eventually receive the information about the target either directly or indirectly. In other words, no matter how many intermediate steps the attacker uses, or what method of communication is used, the flagged, or otherwise identified, packet would still reach the attacking station and would trigger, for example, reporting, showing the path to the attacker. In actuality, the more steps the attacker takes to disguise their origin actually increases the chance of detection given the exposure in multiple nodes between the additional intermediary computing devices.

The two systems, used in conjunction, can cover a broad spectrum of attacks. The long-range attacks with many hops are vulnerable to flag detection at intermediate nodes, while closer range attacks are more vulnerable to direct detection. These techniques avoid the need for general surveillance of individual packets flowing through internet nodes in an effort to track hackers attempting to break into a protected network. It also allows for the protection of the integrity of private information, since all of the information regarding the hacker can be relayed voluntarily to, for example, law enforcement personnel, from, for example, the host detecting the hacker and/or one or more monitoring centers.

In addition to the monitoring systems according to exemplary embodiments of this invention, a retaliatory cyber attack, i.e., counter attack, can be launched at any time after commencement of the unauthorized access attempt. An attacker is most vulnerable to a counter attack during their own attack, since the attacker generally has to substantially remove their system's defensive mechanism. Accordingly, an exemplary embodiment of this invention takes advantage of the hacker's weaknesses and allows the performing of counter attacks in near real-time. Specifically, when a decision on retaliation has been made, for example, by law enforcement personnel, and after confirmation of the attacker's origin, a retaliatory action can be launched. In particular, for example, a concealed program could be embedded into a response to the attacker such as embedded in an HTML page. The program could contain code similar to those found in destructive viruses. The triggering mechanism could be, for example, embedded with additional levels of verification to ensure the hostile intent, identity, or the like, of the attacker. For example, a false request for a password could be made while the target system does not employ password-based security features. By entering any password, or otherwise responding to the request, the attacker could confirm that the attacker is in fact not familiar with the protocols of the target system, and therefore, is an unauthorized user. At the same time, entering any response to, for example, the password could trigger the concealed destructive program that can, for example, destroy files and/or the operating system of the attacker's computer.

Additionally, in an exemplary embodiment of this invention, the targeted system could act as a conduit to relay response information, such as packets, returned to the hacker from one or more of the monitoring centers to retain the original targeted addresses. These response packets may contain flags or retaliation codes as described above, depending on the analysis and the decision made by one or more of the monitoring centers. The restricted tunnel may be implemented using a commercial VPN, a dedicated link with or without encryption, or the like.

FIG. 1 illustrates an exemplary distributed network protection system 100. The distributed network protection system 100 comprises one or more monitoring centers 200, one or more targets 300, and an hacker 400 being connected by links 5 and one or more distributed networks 10. The distributed network protection system 100 can also be connected to one or more other distributed network protection systems and is scalable depending on the particular implementation. Additionally, while the hacker 400 is illustrated as a single entity, it should be appreciated that the hacker 400 can be one or more devices, computers or entities, and can be located at one or more geographic or cyber locations.

While the exemplary embodiment illustrated in FIG. 1 shows the distributed network protection system 100 and associated components collocated, it is to be appreciated that the various components of the distributed network protection system can be located at distant portions of a distributed network, such as a local area network, a wide area network, an intranet, and/or the Internet, or within a dedicated distributed network protection system. Thus, it should be appreciated that the components of the distributed network protection system can be combined into one device or collocated on a particular node of a distributed network. Furthermore, it should be appreciated that for ease of illustration, the various functional components of the distributed network protection system have been divided as illustrated in FIG. 1. However, any of the functional components illustrated in FIG. 1 can be combined without affecting the operation of the system. As will be appreciated from the following description, and for reasons of computational efficiency, the components of the distributed network protection system can be arranged in any location within a distributed network without affecting the operation of the system.

Furthermore, the links 5 can be a wired or wireless link or any other known or later developed element(s) that is capable of supplying and communicating electronic data to and from the connected elements. Additionally, the distributed network protection system can comprise one or more input devices (not shown) that can include, for example, a keyboard, a mouse, a speech text converter, a stylus, or the like. In general, the input device can be any device capable of communicating information to the distributed network protection system 100. Furthermore, the distributed network protection system 100 can comprise one or more display devices (not shown) such as a computer monitor, a display on a PDA, or any other device capable of displaying information to one or more users.

The monitoring centers 200 monitor one or more of traffic and/or alarms received from one or more targets 300. The targets 300 can be a particular node on a distributed network, such as a single entity, or could be scalable, such that the target could be defined based on, for example, a geographic location having a plurality of entities, a country, a portion of an IP address, or the like. In general, the targets 300 can be any device, entity or portion of a distributed network, for which protection is desired. Furthermore, alarms received from the one or more targets 300 can be localized and/or distributed based on the particular implementation specifics.

In operation, for a first exemplary embodiment, in which the individual targets 300 perform an initial unauthorized access attempt detection 20, the target 300 forwards alarm information 30 to one or more monitoring systems 200. The monitoring system 200 optionally commences logging a portion of the transactions with the target 300, and hence, the hacker 400. The monitoring center 200 then identifies the source of the attack and verifies the intrusion attempt as discussed above. For example, using various techniques, the monitoring center 200 can initiate various communications with the hacker 400 in an attempt to verify the authenticity of the unauthorized access attempt. If monitoring system 200 determines that the communications with the target are an unauthorized access attempt, the monitoring system 200 can enter an analysis mode where all or a portion of the communications from the hacker 400 are analyzed to, for example, determine the identity of the hacker, the source of attack, hacking patterns, characteristics of the hack attempt, or the like. Upon determining, for example, the identity and/or location of the hacker, the monitoring system 200 can determine any necessary responsive action that may be appropriate. Depending on the nature of the responsive action, the monitoring center 200 can escalate the unauthorized access attempt to another monitoring center higher in the chain. As previously discussed, the Level 2 monitoring center could, for example, make any decisions regarding possible retaliatory action, compare the referral from the Level 1 monitoring center to other unauthorized access attempts from other Level 1 centers, carry out retaliatory action, or the like.

Figure 2:
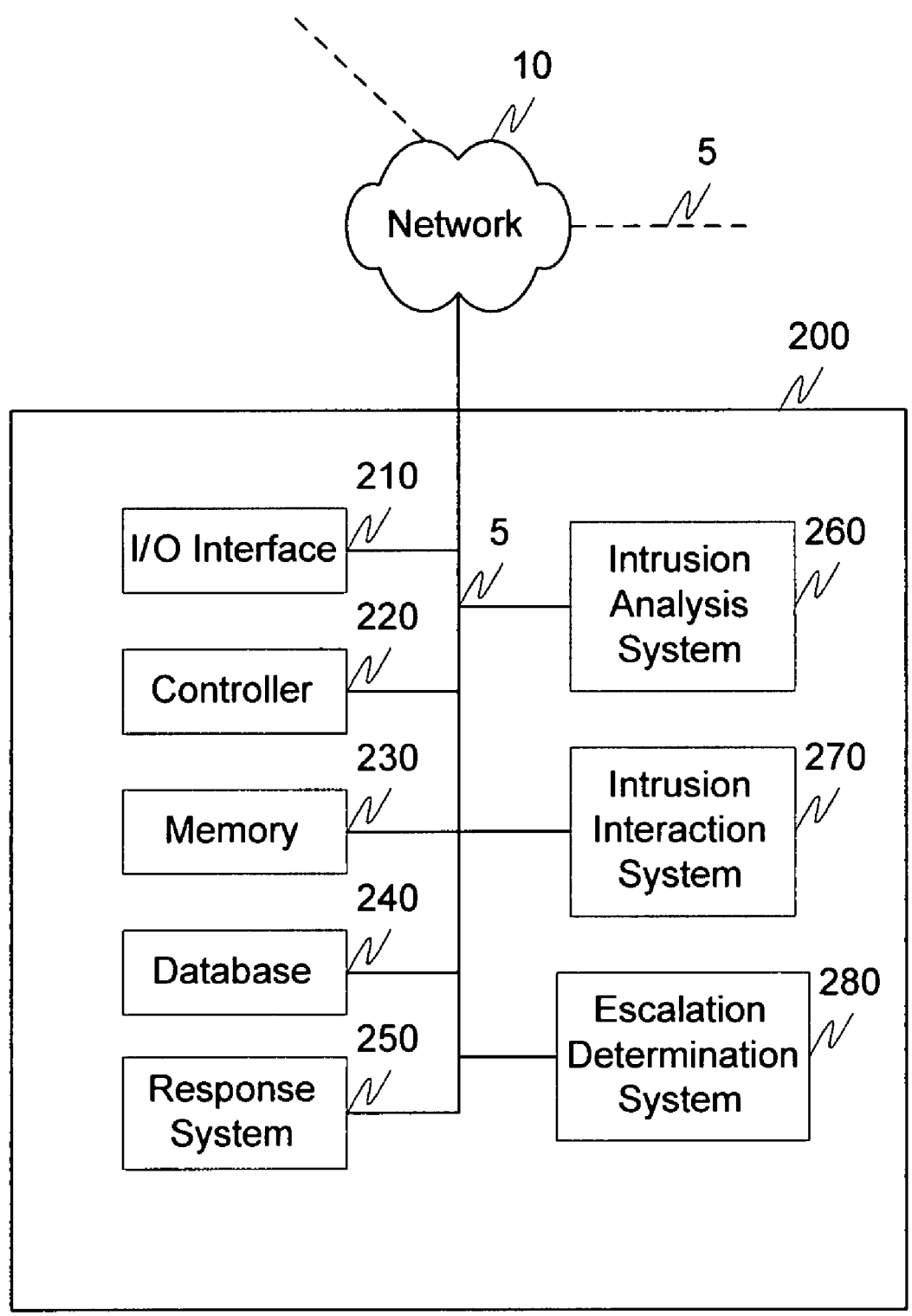
FIG. 2 illustrates an exemplary embodiment of a monitoring center according to this invention.

FIG. 2 illustrates an exemplary monitoring center 200. The monitoring center 200 comprises an I/O interface 210, a controller 220, a memory 230, a database 240, a response system 250, an intrusion analysis system 260, an intrusion reaction system 270, and an escalation determination system 280, all interconnected by link 5. Additionally, the monitoring center 200 can be connected to one or more other monitoring centers and/or targets 300 via network 10 and the links 5.

Upon receiving an alarm from one or more targets, the monitoring center 200, in cooperation with the I/O interface 210, the controller 220, the memory 230, and the intrusion analysis system 260, determines the accuracy of the alarm. In particular, the intrusion analysis system 260, in cooperation with database 240, analyzes the intrusion attempt and compares it to, for example, historical profiles and/or other previous attempts, or communicates with other monitoring centers to determine whether other targets are being attacked with the same or similar unauthorized access requests. Upon verification of the attack, the intrusion analysis system 260, in cooperation with intrusion interaction system 270, the I/O interface 210, the controller 220 and the memory 230, can engage the one or more hackers 400 in an attempt to determine the source of the attack. Then, for example, depending on the scale and success of the attack, the identity of the attacker, and the number of previous attack attempts, the escalation determination system 280 can determine whether, for example, retaliatory action, law enforcement procedures, or the like, should be taken. If it is determined that further action need be taken, the monitoring center 200 can escalate the alarm, and any related alarm information, to another monitoring center higher, for example a Level 2 monitoring center, in the hierarchy. Alternatively, the monitoring center 200 which received the alarm, in cooperation with the response system 250, the I/O interface 210, the controller 220 and memory 230 can, for example, forward various notification messages to the one or more affected or unaffected targets, notifications to one or more other monitoring centers at various levels in the hierarchy, or the like.

Figure 3:
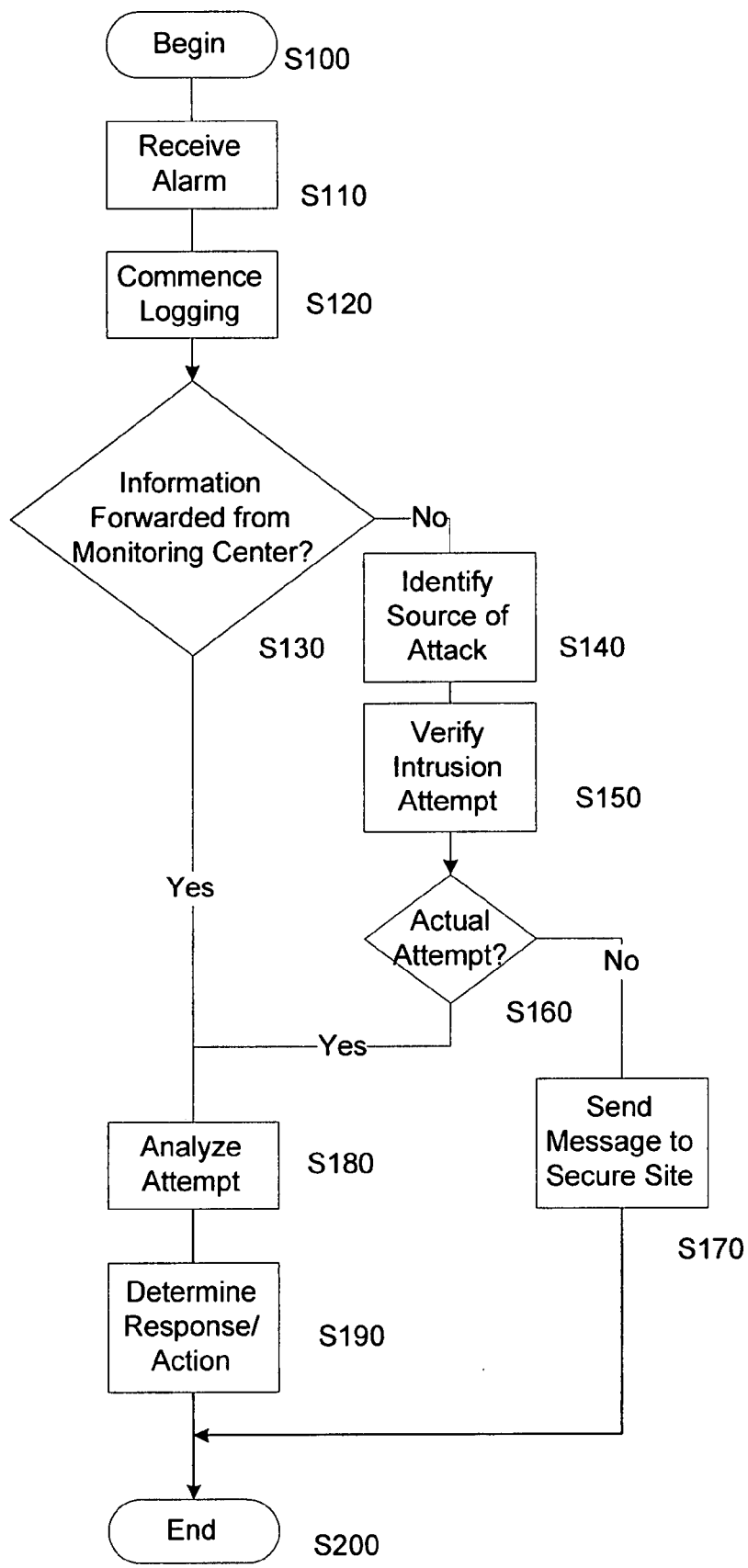
FIG. 3 illustrates an exemplary method of protecting a distributed network according to this invention.

FIG. 3 illustrates an exemplary embodiment of protecting a distributed network according to this invention. In particular, control begins in step S100 and continues to step S110. In step S110, an alarm signal is received from one or more targets. Next in step S120, logging of all or a portion of the information to and/or from the attacked target is commenced. However, it is to be understood that the logging can be performed in a controlled manner where, for example, repetitive events are not logged and thresholds set governing the extent of the logging. Control then continues to step S130.

In step S130, a determination is made whether the alarm information is being forwarded from another monitoring center. If the alarm information is being forwarded from another monitoring center, such as from a Level 1 monitoring center to a Level 2 monitoring center, control jumps to step S180. Otherwise, control continues to step S140.

In step S140, the source of the attack is identified. Next, in step S150, the communications with the target are verified as an unauthorized access attempt. Then, in step S160, if the communications with the target are determined to be an unauthorized access attempt, control jumps to step S180. Otherwise, control optionally continues to step S170 where, for example, a message is forwarded to the target indicating, for example, there has been a false alarm.

In step S180, the unauthorized access attempt is analyzed. Next, in step S190, any responsive action is determined. Control then continues to step S200, where the control sequence ends.

Figure 4:
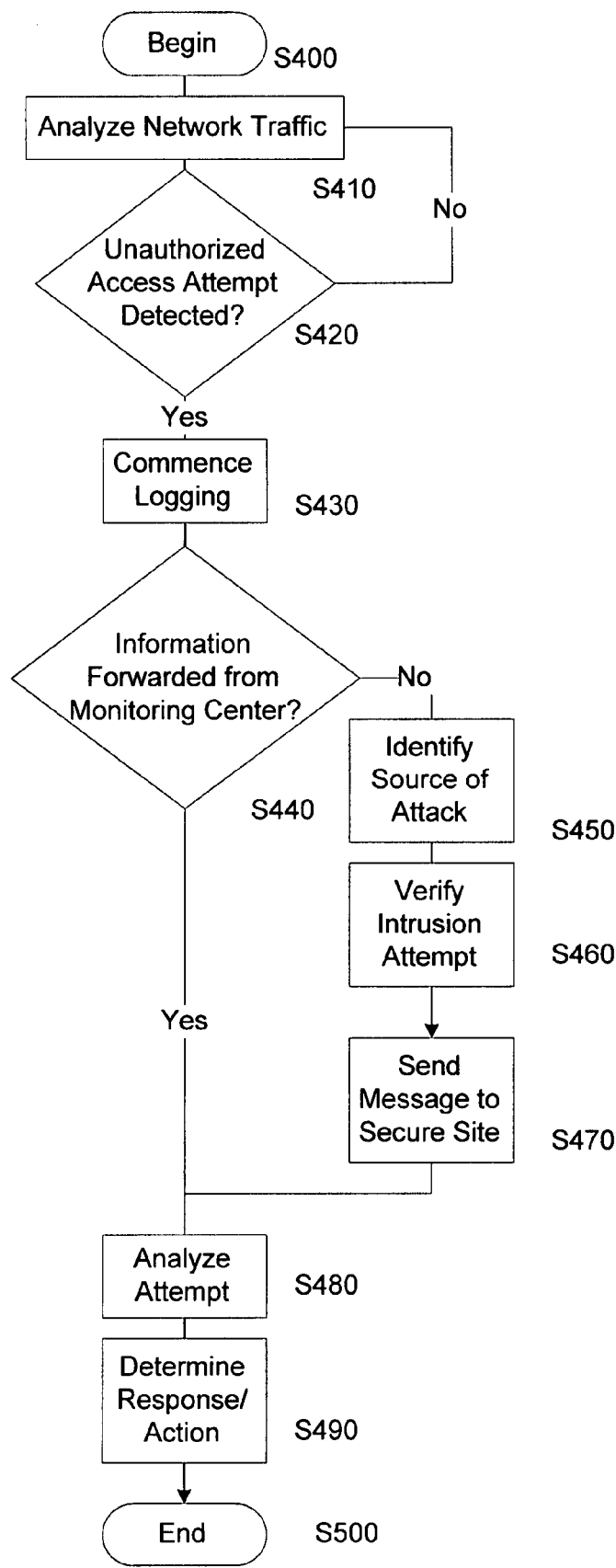
FIG. 4 is a flowchart outlining a second exemplary method for protecting a distributed network according to this invention.

FIG. 4 illustrates a second exemplary embodiment for protecting a distributed network according to this invention. In particular, in this exemplary embodiment, one or more monitoring centers are responsible for detecting unauthorized access attempts. Specifically, control begins in step S400 and continues to step S410. In step S410, network traffic on a portion of a distributed network is analyzed. Next, in step S420, a determination is made whether an unauthorized access attempt has been detected. If no unauthorized access attempt has been detected, control continues to step S430. Otherwise, control jumps back to step S410.

In step S430, logging of, for example, all communications from a particular origin to a particular destination are recorded. Next, in step S440, a determination is made whether information regarding the unauthorized access attempt has been forwarded or received by another monitoring center. If the alarm information has been escalated from another monitoring center, control jumps to step S480, where, for example, the gathered information can be compared, analyzed, or the like. Otherwise, control continues to step S450. In step S450, the source of the attack is identified. Next, in step S460, the intrusion attempt is verified. Then, in step S470, an optional message can be sent to the target indicating an intrusion attempt is underway. Control then continues to step S480.

In step S480, the unauthorized access attempt can be analyzed, and compared to, for example, other unauthorized access attempts, or the like. Next, in step S490, responsive action to the unauthorized access attempt is determined. Control then continues to step S500 where the control sequence ends.

As illustrated in FIGS. 1-2, the distributed network protection system can be implemented either on a single programmed general purpose computer or a separate programmed general purpose computer. However, the distributed network protection system can also be implemented on a special purpose computer, microprocessor or microcontroller and peripheral integrated circuit element, an ASIC or other integrated circuit, a digital signal processor, a hardwired electronic or logic circuit, such as a discrete element circuit, a programmable logic device such as a PLD, PLA, FPGA, PAL, or the like. In general, any device capable of implementing a finite state machine that is in turn capable of implementing the flowcharts in FIGS. 3-4 can be used to implement the distributed network protection system according to this invention.

Furthermore, the disclosed method may be readily implemented in software using object or object-oriented software development environments that provide portable source code that can be used on a variety of computer or workstation hardware platforms. Alternatively, the disclosed distributed network protection system may be implemented partially or fully in hardware using standard logic circuits or VLSI design. Whether hardware or software is used to implement the systems and methods in accordance with this invention is dependent on the speed and/or efficiency requirements of the system, the particular function, and the particular software and/or hardware systems or microprocessor or microcomputer systems being utilized. The distributed network protection system illustrated herein, however, can be readily implemented in hardware and/or software using any known or later-developed systems or structures, devices and/or software by those of ordinary skill in the applicable art from the functional description provided herein and with a general basic knowledge of the computer arts.

Moreover, the disclosed methods may be readily implemented as software executed on a programmed general purpose computer, a special purpose computer, a microprocessor or the like. In these instances, the methods and systems of this invention can be implemented as a program embedded in a personal computer, a piece of executable code, or the like, such as a Java® or CGI script, as an cookie, as a resource residing on a server or graphics workstation, as a routine embedded in a dedicated distributed network protection system, or the like. The distributed network protection system can also be implemented by physically incorporating the systems and methods into a hardware and/or software system, such as the hardware and software systems of a computer or dedicated distributed network protection system.

The devices and subsystems of the exemplary embodiments of FIGS. 1-4 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, etc. Non-volatile media can include, for example, optical or magnetic disks, magneto-optical disks, and the like. Volatile media can include dynamic memories, and the like. Transmission media can include coaxial cables, copper wire, fiber optics, and the like. Common forms of computer-readable media can include, for example, a floppy disk, a flexible disk, hard disk, magnetic tape, any other suitable magnetic medium, a CD-ROM, CDRW, DVD, any other suitable optical medium, a RAM, a PROM, an EPROM, a FLASH-EPROM, any other suitable memory chip or cartridge, or any other suitable medium from which a computer can read.

It is, therefore, apparent that there has been provided, in accordance with the present invention, systems and methods for protecting distributed networks. While this invention has been described in conjunction with a number of embodiments, it is evident that many alternatives, modifications and variations would be or are apparent to those of ordinary skill in the applicable art. Accordingly, applicants intend to embrace all such alternatives, modifications and variations that are within the spirit and scope of this invention.

What is claimed is:

1. A communications network protection system, the system comprising:

one or more protected communications networks, including one or more computers or devices that serve as a target of a hacker attack over the protected communications networks;

one or more first level monitoring centers monitoring hacker attacks over the protected communications networks in a geographical area or an organizational structure corresponding to the protected communications networks;

one or more second level monitoring centers receiving from the first level monitoring centers information regarding the hacker attacks in the geographical area or the organizational structure corresponding to the protected communications networks and determining appropriate retaliatory or legal action against the hacker attacks;

one or more third level monitoring centers receiving from the second level monitoring centers information regarding the hacker attacks and determining an overall security condition of the protected communications networks;

one or more centralized databases located within respective of the third level monitoring centers for maintaining information regarding the overall security condition of the protected communications networks; and one or more distributed databases linked to the centralized databases and located within respective of the first and second level monitoring centers for maintaining respective information regarding the monitored hacker attacks in the geographical area or the organizational structure corresponding to the protected communications networks and the determined appropriate retaliatory or legal action against the hacker attacks, wherein the first level monitoring centers receive information on a hacker attack in progress over the protected communications networks from the protected communications networks and based on a referral from a site of the protected communications networks that was attacked pose as the attacked site to an attacker for positive identification of the attacker, and once the hacker attack is confirmed, the attacked site or one of the first level monitoring centers sends a response to the attacker and including a concealed flag in the response for detection of the response via the flag, as the response passes through communications networks, for identifying the origin of the hacker attack and locations of previous attacks related to the hacker attack.

2. The system of claim 1, wherein the hacker attacks are determined by the first level monitoring centers based on real-time unauthorized access attempt alarms received from the protected communications networks.

3. The system of claim 1, wherein the geographical area includes commercial and public sites corresponding to the protected communications networks.

4. The system of claim 1, wherein the organizational structure includes law enforcement, Department of Defense, Armed Forces, government, commercial organizations, or e-commerce sites corresponding to the protected communications networks.

5. The system of claim 1, wherein the second level monitoring centers receive referrals from the first level monitoring centers and make a decision on possible retaliatory action or other action if warranted based on a nature of an attack.

6. The system of claim 1, wherein the third level monitoring centers collect and analyze information received from the second level monitoring centers to monitor the overall security condition of the protected communications networks, including a national cyberspace of one or more countries.

7. The system of claim 1, wherein the protected communications networks include one or more unauthorized access attempt detection systems for determining the hacker attacks and reporting the hacker attacks to the first level monitoring centers.

8. The system of claim 7, wherein the unauthorized access attempt detection systems are embedded in a firewall or operating system of the protected communications networks to gather information about an unauthorized access in real-time or near real-time and provide the gathered information to the first level monitoring centers.

9. The system of claim 1, wherein the centralized and distributed databases include mechanisms to shield from unauthorized access, to host data, to store detailed data regarding a hacker or attacker, and to store data regarding law enforcement and links to law enforcement agencies.

10. A communications network protection method, the method comprising:
monitoring, via one or more first level monitoring centers, hacker attacks for one or more protected communications networks, including one or more computers or devices that serve as a target of a hacker attack over the protected communications networks, including monitoring hacker attacks over the protected communications networks in a geographical area or an organizational structure corresponding to the protected communications networks;
receiving, via one or more second level monitoring centers, information from the first level monitoring centers regarding the hacker attacks in the geographical area or the organizational structure corresponding to the protected communications networks, including determining appropriate retaliatory or legal action against the hacker attacks;
receiving, via one or more third level monitoring centers, information from the second level monitoring centers regarding the hacker attacks, including determining an overall security condition of the protected communications networks;
maintaining, via one or more centralized databases located within respective of the third level monitoring centers, information regarding the overall security condition of the protected communications networks; and
maintaining, via one or more distributed databases linked to the centralized databases and located within respective of the first and second level monitoring centers, respective information regarding the monitored hacker attacks in the geographical area or the organizational structure corresponding to the protected communications networks and the determined appropriate retaliatory or legal action against the hacker attacks,
wherein the first level monitoring centers receive information on a hacker attack in progress over the protected communications networks from the protected communications networks and based on a referral from a site of the protected communications networks that was attacked pose as the attacked site to an attacker for positive identification of the attacker and
once the hacker attack is confirmed, the attacked site or one of the first level monitoring centers sends a response to the attacker and including a concealed flag in the response for detection of the response via the flag, as the response passes through communications networks, for identifying the origin of the hacker attack and locations of previous attacks related to the hacker attack.

11. The method of claim 10, wherein the hacker attacks are determined by the first level monitoring centers based on real-time unauthorized access attempt alarms received from the protected communications networks.

12. The method of claim 10, wherein the geographical area includes commercial and public sites corresponding to the protected communications networks.

13. The method of claim 10, wherein the organizational structure includes law enforcement, Department of Defense, Armed Forces, government, commercial organizations, or e-commerce sites corresponding to the protected communications networks.

14. The method of claim 10, wherein the second level monitoring centers receive referrals from the first level monitoring centers and make a decision on possible retaliatory action or other action if warranted based on a nature of an attack.

15. The method of claim 10, wherein the third level monitoring centers collect and analyze information received from the second level monitoring centers to monitor the overall security condition of the protected communications networks, including a national cyberspace of one or more countries.

16. The method of claim 10, wherein the protected communications networks include one or more unauthorized access attempt detection systems for determining the hacker attacks and reporting the hacker attacks to the first level monitoring centers.

17. The method of claim 16, wherein the unauthorized access attempt detection systems are embedded in a firewall or operating system of the protected communications networks to gather information about an unauthorized access in real-time or near real-time and provide the gathered information to the first level monitoring centers.

18. The method of claim 10, wherein the centralized and distributed databases include mechanisms to shield from unauthorized access, to host data, to store detailed data regarding a hacker or attacker, and to store data regarding law enforcement and links to law enforcement agencies.

19. A computer program product for communications network protection, including one or more computer readable instructions stored on a computer readable medium and configured to cause one or more computer processors to perform the steps of:
monitoring, via one or more first level monitoring centers, hacker attacks for one or more protected communications networks, including one or more computers or devices that serve as a target of a hacker attack over the protected communications networks, including monitoring hacker attacks over the protected communications networks in a geographical area or an organizational structure corresponding to the protected communications networks;

receiving, via one or more second level monitoring centers, information from the first level monitoring centers regarding the hacker attacks in the geographical area or the organizational structure corresponding to the protected communications networks, including determining appropriate retaliatory or legal action against the hacker attacks;

receiving, via one or more third level monitoring centers, information from the second level monitoring centers regarding the hacker attacks, including determining an overall security condition of the protected communications networks;

maintaining, via one or more centralized databases located within respective of the third level monitoring centers, information regarding the overall security condition of the protected communications networks; and maintaining, via one or more distributed databases linked to the centralized databases and located within respective of the first and second level monitoring centers, respective information regarding the monitored hacker attacks in the geographical area or the organizational structure corresponding to the protected communications networks and the determined appropriate retaliatory or legal action against the hacker attacks, wherein the first level monitoring centers receive information on a hacker attack in progress over the protected communications networks from the protected communications networks and based on a referral from a site of the protected communications networks that was attacked pose as the attacked site to an attacker for positive identification of the attacker, and once the hacker attack is confirmed, the attacked site or one of the first level monitoring centers sends a response to the attacker and including a concealed flag in the response for detection of the response via the flag, as the response passes through communications networks, for identifying the origin of the hacker attack and locations of previous attacks related to the hacker attack.

20. The computer program product of claim 19, wherein the hacker attacks are determined by the first level monitoring centers based on real-time unauthorized access attempt alarms received from the protected communications networks.

21. The computer program product of claim 19, wherein the geographical area includes commercial and public sites corresponding to the protected communications networks.

22. The computer program product of claim 19, wherein the organizational structure includes law enforcement, Department of Defense, Armed Forces, government, commercial organizations, or e-commerce sites corresponding to the protected communications networks.

23. The computer program product of claim 19, wherein the second level monitoring centers receive referrals from the first level monitoring centers and make a decision on possible retaliatory action or other action if warranted based on a nature of an attack.

24. The computer program product of claim 19, wherein the third level monitoring centers collect and analyze information received from the second level monitoring centers to monitor the overall security condition of the protected communications networks, including a national cyberspace of one or more countries.

25. The computer program product of claim 19, wherein the protected communications networks include one or more unauthorized access attempt detection systems for determining the hacker attacks and reporting the hacker attacks to the first level monitoring centers.

26. The computer program product of claim 25, wherein the unauthorized access attempt detection systems are embedded in a firewall or operating system of the protected communications networks to gather information about an unauthorized access in real-time or near real-time and provide the gathered information to the first level monitoring centers.

27. The computer program product of claim 19, wherein the centralized and distributed databases include mechanisms to shield from unauthorized access, to host data, to store detailed data regarding a hacker or attacker, and to store data regarding law enforcement and links to law enforcement agencies.

* * * * *